Sept. 20, 1971 E. A. BROWN 3,605,310
ANIMAL IDENTIFICATION MARKER AND TOOL FOR APPLYING SAME
Filed May 13, 1968

INVENTOR
EDWARD A. BROWN
BY
Browne, Schuyler & Beveridge
ATTORNEYS

United States Patent Office 3,605,310
Patented Sept. 20, 1971

3,605,310
ANIMAL IDENTIFICATION MARKER AND
TOOL FOR APPLYING SAME
Edward A. Brown, 905 6th Ave.,
Dodge City, Kans. 67801
Filed May 13, 1968, Ser. No. 728,483
Int. Cl. G09f 3/00
U.S. Cl. 40—301                                    2 Claims

ABSTRACT OF THE DISCLOSURE

An animal identification marker and a tool for inserting it through a hole in an animal's ear. The marker has a generally arrow shaped head, an intermediate stem portion of reduced width which extends through the hole in the animal's ear, and a generally rectangular tail portion which extends transversely of the stem. The tool has a punch for forming a hole in the animal's ear, and a means for inserting the marker through the hole.

SUMMARY OF INVENTION

This invention relates to a novel animal identification marker and also to a novel tool for applying the marker to an animal's ear.

One of the objects of the present invention is to provide a new and improved animal identification marker as well as a tool for inserting the marker through an animal's ear.

A further object is to provide such a novel marker which may be quickly and easily applied to the animal's ear in the field and moreover in a sanitary manner. Included herein is the provision of such a marker that will permanently be retained in the animal's ear.

A still further object is the provision of such a marker and tool which enable the marker to be applied to the animal's ear without cumbersome deformation or manipulation of the marker or the animal's ear.

Yet, another object of the present invention is the provision of such a marker that may be economically manufactured with a novel shape that will also be readily visible when applied to the animal.

The above objects are achieved by a marker having a planar body including an intermediate stem portion of reduced width, a generally arrow shaped head portion positioned on one end of the stem, and a generally rectangular tail portion extending transversely across the other end of the stem portion. In applying the marker, a hole is first punched through the animal's ear and then the head portion of the marker is forced through the hole to position the stem portion in the hole with the head and tail portions located on opposite sides of the ear. The diameter of the hole is made substantially equal to the width of the stem portion of the marker. Thus, once the marker is inserted with the stem extending through the hole in the animal's ear, the head and tail portions of the marker will prevent accidental dislodgement of the marker from the hole. To facilitate insertion of the head portion of the marker through the hole in the animal's ear, the head portion is formed with a pair of recesses on the opposite sides of the stem to define a pair of flexible fingers which are deformable inwardly during insertion of the marker.

The tool for applying the marker includes a pair of pliers type handle portions pivoted together intermediate their ends for movement towards and away from each other. Slidably mounted in one of the handle portions is a punch that is depressed upon pivoting the handle portions towards each other. An anvil portion is spaced below the extremity of the punch so that, to form a hole through the animal's ear, the latter is placed between the anvil and the extremity of the punch, and the punch is depressed through the animal's ear into a passage in the anvil.

After a hole is punched through the animal's ear, the marker is inserted through the hole by first placing the marker in a holder formed on the end of one of the handle portions of the tool. In one embodiment, the holder includes a flat plate pivoted on a flat nose portion formed on the end of the handle portion. A coil spring is positioned between the plate and the nose portion to bias the plate into engagement with the nose portion.

To insert the marker in the holder, the plate is pivoted against the bias of the spring and the tail portion of the marker is inserted in the sapce between the plate and the nose portion. The animal's ear is then placed between the handle portions with the head of the marker generally aligned with the hole in the animal's ear. The handle portions are then pivoted towards each other to project the arrow head portion of marker through the hole. Once the head passes through the hole in the animal's ear, it is guided by an aperture formed in a flange on the end of the other handle portion which overlies the nose portion.

Other objects and advantages of the present invention will become apparent from the following more detailed description taken in conjunction with the attached drawings in which.

DETAILED DESCRIPTION

Figure 1:
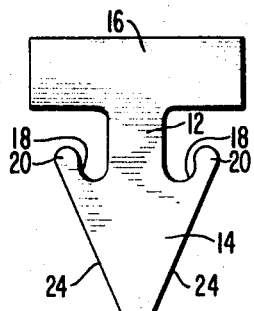
FIG. 1 is a plan view of an animal identification marker, constructed in accordance with the present invention.
Figure 2:
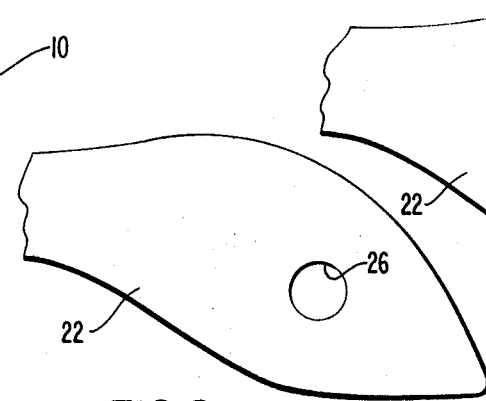
FIG. 2 is a plan view of an animal's ear that is pierced for receiving the marker of FIG. 1.
Figure 3:
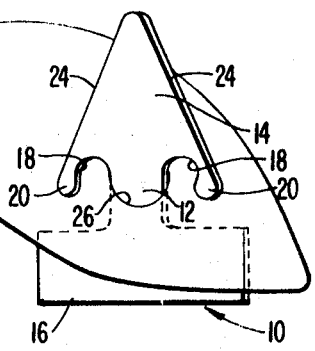
FIG. 3 is a view generally similar to FIG. 2 except the animal's ear is shown with a marker inserted.

Referring to the drawings in detail, there is shown an animal identification marker or tag generaly designated 10 constructed in accordance with the present invention and preferably having an integral sheet plastic construction. Marker 10 includes an intermediate stem portion 12 of reduced width, a generally arrow shaped head portion 14 projecting longitudinally from one end of the stem portion, and a generally rectangular tail portion 16 extending transversely across the opopsite end of stem portion 12. Recesses 18 are formed in the marker on opposite sides of the stem so as to form a pair of resilient fingers 20 at the divergent ends of head portion 14 on opposite sides of the stem. Resilient fingers 20 serve to facilitate insertion of the marker into the animal's ear 22 as will be described.

Marker 10 is symmetrical about its longitudinal axis and the proportions between its various parts are represented in FIG. 1 of the drawings. In one preferred embodiment, the overall length of the marker measured along its longitudinal axis is approximately two inches while its overall width measured transversely along the tail portion is one and one-half (1½) inches. Additionally, the width of stem portion is approximately three-eights (⅜) of an inch while the width of the tail portion measured longitudinally of the marker is approximately one-half (½) of an inch. The length of the stem is approximately one-quarter (¼) of an inch while the spacing between the extremities of fingers 20 and tail portion 16 is approximately three-sixteenths (3/16) of an inch. As in the shown embodiment, it is preferred that tail portion 16 extend transversely a greater distance than the widest transverse dimension of the head portion 14. In the preferred embodiment, the head at its widest point is approximately one and one-eighth (1⅛) inches. Furthermore, the opposite edge portions 24 of the head portion in the preferred embodiment extend at an angle of approximately 45° with respect to each other.

In applying the marker to an animal's ear, a hole 26 is pierced through the animal's ear by any suitable tool such as will be described. The diameter of the hole 26 which is formed in the animal's ear is approximately the same as the width of stem portion 12 of the marker. The marker is then forced through hole 26 by first inserting the pointed tip of head portion 14 through the hole and then forcing the entire head portion through the hole until stem 12 is received in the hole with the head and tail portions on opposite sides of the ear.

Inasmuch as the diameter of hole 26 is less than the width of head portion 14 taken at its widest point, the marker must be inserted with sufficient force to deform stretch or tear portions of the cut edges of the hole in the animal's ear in order to permit the head portion to pass through the hole. The latter step is also facilitated by resilient fingers 20 which will deflect inwardly when engaged by opposite portions of the animal's ear during insertion of the marker. Once the marker is inserted in the ear, the deformed or torn portions of the animal's ear which resulted from insertion of the marker, will heal leaving a hole which receives the stem and is smaller than the head and tail portions. Thus, the marker will be permanently retained in the animal's ear against dislodgment.

During the period immediately following insertion of the marker in the animal's ear, and before the torn or deformed portions of the animal's ear heal, resilient fingers 20 function to maintain the marker in the ear against dislodgment. This results from the fact that after the marker is inserted in the animal's ear, the resilient fingers return to their normal position thereby presenting a greater width dimension than the hole in the animal's ear. To additionally insure retention of the marker in the ear immediately following insertion, the marker may be slightly turned so as to remove the head portion of the marker from alignment with the widest portions of the hole formed in the animal's ear as a result of insertion of the marker.

Figure 4:
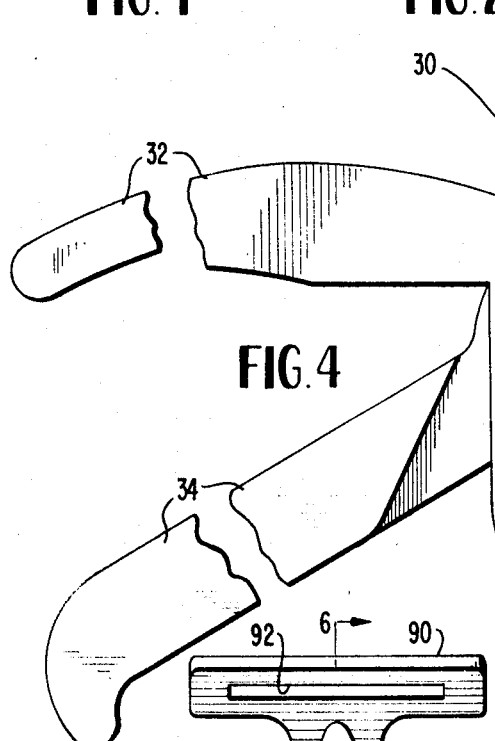
FIG. 4 is a side elevational view of a novel tool embodying the invention, for piercing an animal's ear and inserting the marker therein.
Figure 5:
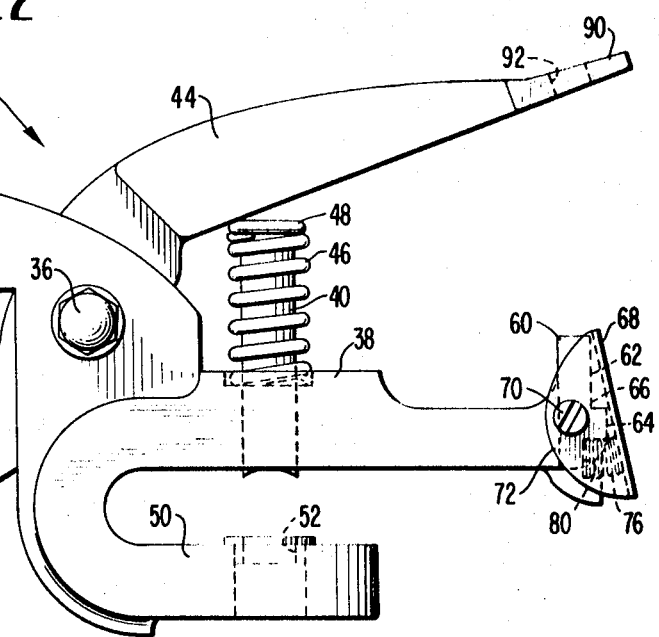
FIG. 5 is an end view of the tool shown in FIG. 4 but with a marker held therein for insertion through an animal's ear.
Figure 5:
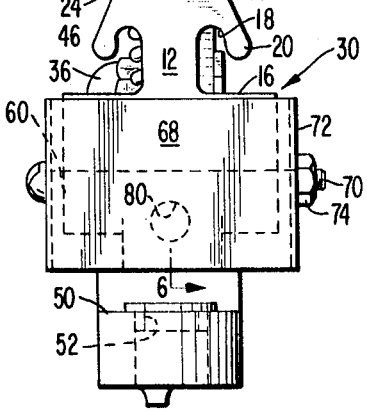
Figure 6:
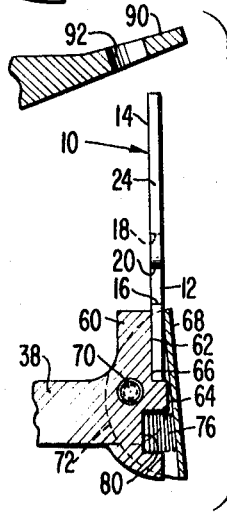
FIG. 6 is a fragmental cross-sectional view of the tool taken generally along lines 6—6 of FIG. 5.

Referring to FIGS. 4, 5 and 6, there is shown a novel tool generally designated 30 for punching a hole in the animal's ear and also for inserting the marker. This tool is of the pliers type and includes a pair of handle portions 32 and 34 pivotally interconnected by pin 36 intermediate their ends for movement towards and away from each other. In the forward section 38 of handle 32, there is slidably mounted a punch 40 which projects upwardly to be engageable by section 44 of handle 34 upon pivoting of the handles towards each other. A coil compression spring 46 is placed about punch 40 with one end engaging handle section 38 and the opposite end engaging a head 48 formed on the upper end of punch 40. Spring 46 thus biases punch 40 upwardly and also biases the handle portions away from each other.

Handle section 38 is formed with a flange 50 recessed inwardly from the extremity of section 38 to underlie the lower end of punch 40. In use, the animal's ear is placed between the lower end of the punch and the flange 50, and then the handles are grasped and pivoted together to force the punch through the animal's ear. Flange 50 is provided with a passage 52 dimensioned to receive the lower end of the punch after it passes through the animal's ear. The cut portions of the animal's ear are forced through passage 52. It will thus be seen that flange 50 in effect forms an anvil and guide for positioning the animal's ear during the piercing process.

After hole 26 is pierced, the next step is to insert the marker, and in accordance with an aspect of the invention, tool 30 is equipped with a feature for inserting the marker. This feature includes an enlarged nose portion 60 formed on the end of handle section 38. Nose portion 60 has two flat surfaces 62, 64 offset from each other to provide a recess 66 dimensioned to receive tail portion 16 of the marker. A holder plate 68 is pivoted to the nose portion to overlie the two surfaces 62, 64. In the shown embodiment plate 68 is pivoted by means a screw 70 received through opposite tabs 72 formed on the ends of the plate. Screw 70 extends through nose portion 60 and is secured against dislodgment by a nut 74.

Between surface 64 and plate 68 there is provided a coil compression spring 76 for biasing the upper portion of the plate into engagement with surface 62. To locate and retain spring 76 in proper position, a passage 80 may be formed in the nose for receiving one end of the spring.

To insert a marker plate 68 is pivoted against the bias of spring 76 to open recess 66 between surface 62 and the plate. Tail portion 16 of the marker is then inserted into recess 66 and the plate is released so that spring 76 will pivot the plate into engagement with the marker to retain the marker in position on the tool as shown. With the tool in open position, the animal's ear is placed between the handle sections 38 and 44 and with the head 14 of the marker in general alignment with the hole 26 which was previously punched in the animal's ear. Handle portions 32, 34 are then grasped and squeezed together to force the marker through the hole in the animal's ear. In order to insure that the marker is properly positioned generally vertically so as to maximize the efficiency of the insertion forces, the upper handle section 44 is provided with a flange 90 having an elongated aperture 92 dimensioned to receive and guide head portion 14 of the marker as it emerges from the animal's ear. After the marker is inserted in the aforedescribed manner, the tool may be easily detached from the marker for the next operation.

Modifications and adaptations of the present invention readily apparent from the foregoing description and associated drawings, although not specifically mentioned herein, will nevertheless be included within the scope of the present invention as indicated in the appended claims.

I claim:

1. A method of inserting an animal identification marker in an aperture in an animal's ear, the marker being of the type having a generally triangular flat head portion extending longitudinally of the marker and having opposite side edges converging towards one end of the marker, a tail portion extending transversely of the marker at the opposite end thereof, and an intermediate stem portion interconnecting said head and tail portions and having a width substantially less than the widest cross dimension of said head and tail portions; the steps comprising placing the tail portion of the marker in one of two relatively movable jaws of a marker insertion tool with the head portion of the marker projecting from said one jaw and directed toward the other jaw of the tool, positioning the jaws of the tool on opposite sides of the animal's ear, and moving the jaws relative to and towards each other to insert the head portion of the marker through the aperture in the animal's ear to place the stem portion in the aperture with the head portion and tail portion on opposite sides of the ear.

2. A method of marking an animal for identification utilizing a marker having a generaly triangular flat head portion extending longitudinally of the marker and having opposite side edges converging towards one end of the marker, a tail portion extending transversely of the marker at the opposite end thereof, and an intermediate stem portion extending longitudinally of the marker and interconnecting said head and tail portions and having a width substantially less than the widest cross-dimensions of said head and tail portions; the steps comprising cutting an aperture through the animal's ear generally equal to the width of said stem portion of the marker, placing the tail portion of the marker in one of two relatively movable jaws of a marker insertion tool with the head portion of the marker projecting from said one jaw and directed toward the other jaw of the tool, positioning the jaws of the tool on opposite sides of the animal's ear with the said one end of the marker in alignment with the aperture in the animal's ear, and moving the jaws relative to and towards each other to force the head portion of the marker through the aperture in the animal's ear and with sufficient force to cause the opposite converging edges of the head portion of the marker to engage and tear or stretch portions of the animal's ear on opposite sides of the aperture to enlarge the aperture and cause the head portion of the marker to pass entirely through the aperture until said stem portion is received in the aperture with the said tail and head portions of the marker positioned on opposite sides of animal's ear.

References Cited

UNITED STATES PATENTS

| | | | |
|---|---|---|---|
| 2,097,965 | 11/1937 | Caulk, Jr. | 40—22 |
| 3,334,433 | 8/1967 | Gospodnetich | 40—301 |
| 3,468,050 | 9/1969 | Pool | 40—302 |
| 3,552,051 | 1/1971 | Ritchey | 40—301 |

WILLIAM H. GRIEB, Primary Examiner

U.S. Cl. X.R.

227—67; 40—22